United States Patent Office 3,203,521
Patented Aug. 31, 1965

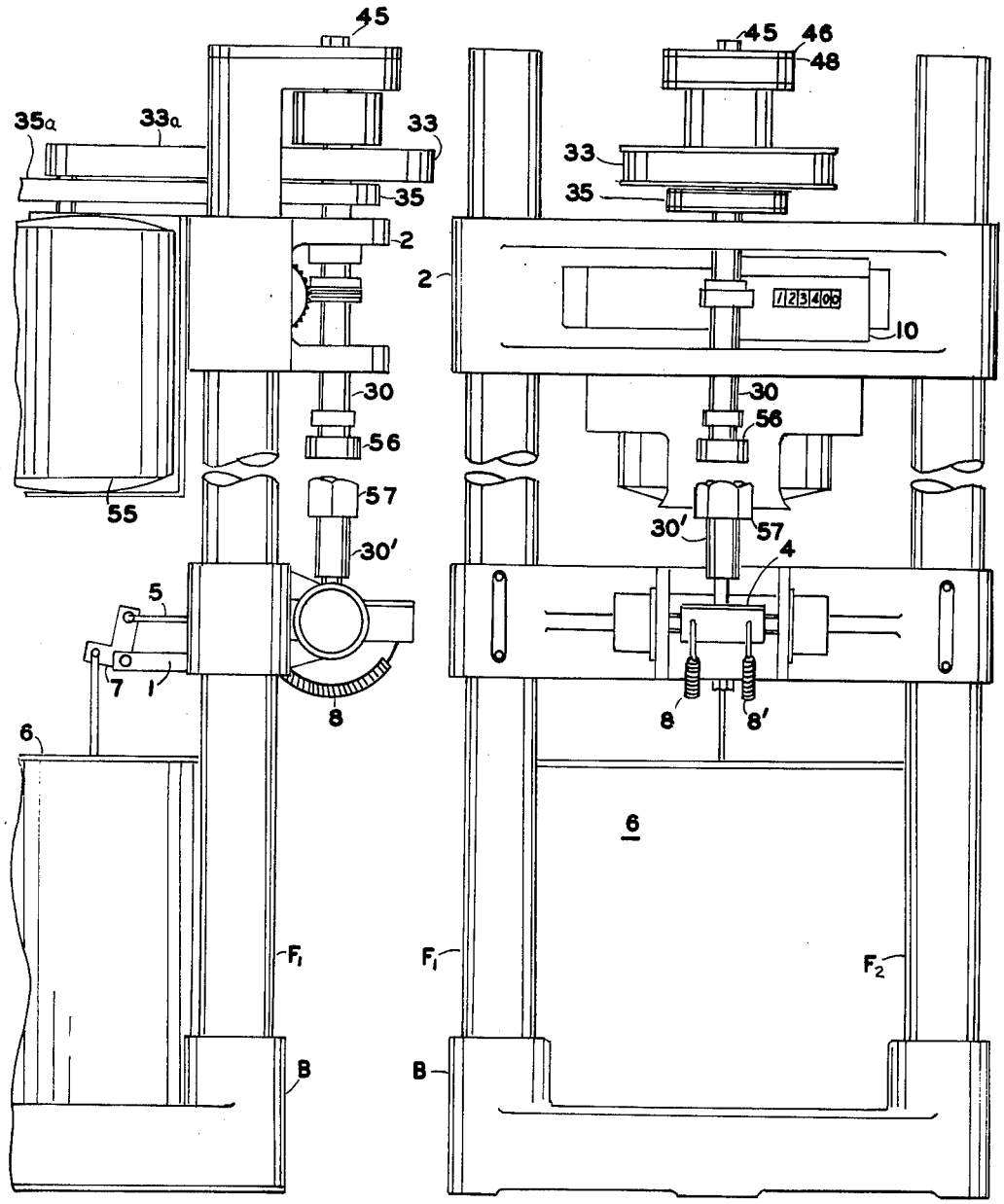

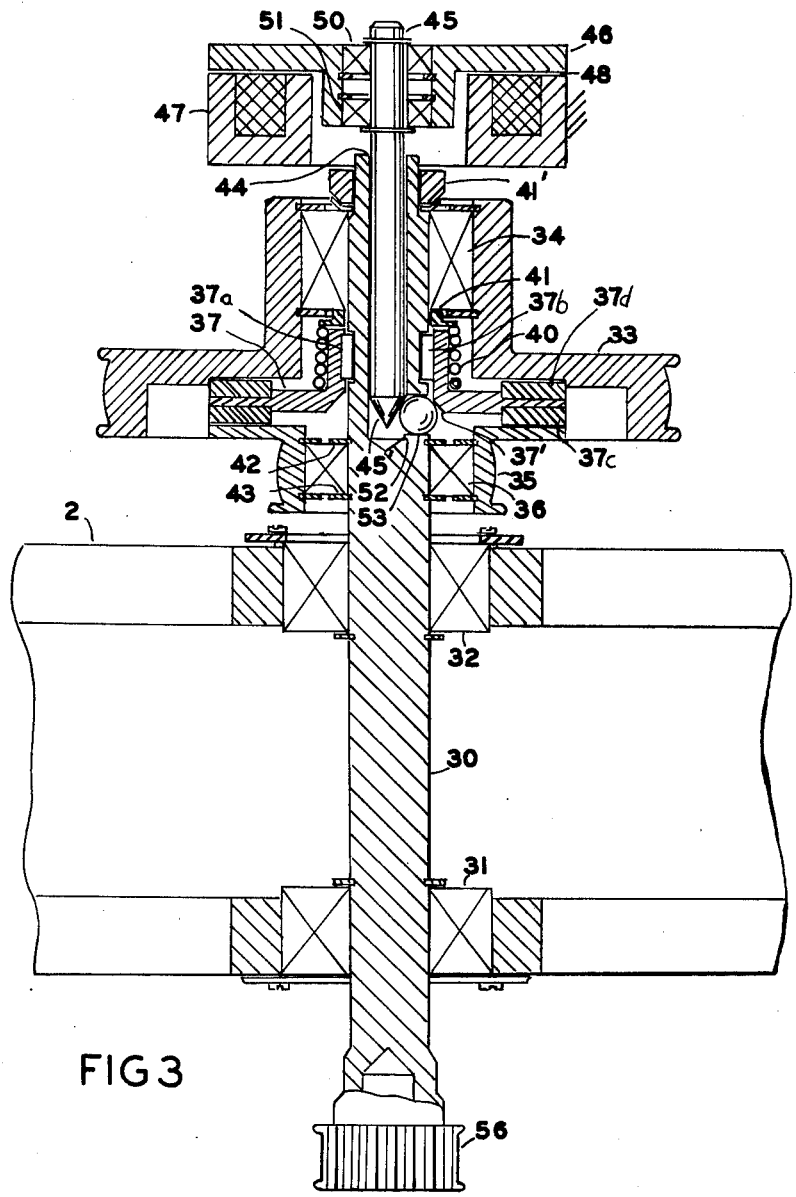

3,203,521
HIGH SPEED MAGNETIC CLUTCH MEANS
Karl F. Frank, Garden City, N.Y., assignor to Micro Balancing, Incorporated, Garden City Park, N.Y.
Filed Feb. 1, 1963, Ser. No. 255,506
5 Claims. (Cl. 192—48)

This invention relates to high speed magnetic clutch means and more particularly to such means which is dual speed, fast acting, and extremely sensitive.

The invention is illustrated in connection with a high speed rotating bending fatigue testing machine where it is desired to change shaft speed from a high to a low speed having a high speed ratio 10 to 1, in programmed pulses of very short duration.

The purpose of the testing machine is the performance of high speed rotating beam bending fatigue tests under constant amplitude as well as programmed variable amplitude loading. Loads are applied using a combination of load springs and an electro-magnetic force generator acting through a mechanical force multiplier.

Maximum versatility of load programs is provided by a constant amplitude, spring applied base load and discrete superimposed infinitely variable load levels. The variable preset base load is always present while the surcharge loads may be applied through a punched traveling tape type programmer in any desired sequence such as stepwise increasing, stepwise decreasing, or random. The number of cycles of application of each load level is variable from a minimum of 5 cycles upward, with the aid of a dual speed driving mechanism and an accurate counter. Infrequent high load levels are applied at a low speed of 600 r.p.m. and other loads at a standard high speed of 6000 r.p.m. The speed change which is accomplished by the fast operating magnetic clutch of the present invention, is programmed together with the loading sequence and allows greater accuracy of load cycles.

The fatigue testing machine applies accelerated typical stress patterns to rotating testing pieces. The test pieces may for instance be a bolt used in a vehicle or aircraft. In order to test the pieces properly it is desired to apply high and low speed programmed stress loads which have been developed from machines in service tests with a driven vehicle or aircraft. A two speed drive is desired to change the speed extremely rapidly for accelerated testing.

The present invention was developed to solve this problem, and generally comprises a clutch means which is electro-magnetically operated to connect the drive shaft to either a high speed pulley or a low speed pulley. In order to make the clutch extremely sensitive, the clutch member moves only .005 inch between its high speed and low speed positions. This movement is provided by a novel arrangement wherein a pin is actuated by the magnetic coil, the pin being axially mounted in a shaftway in the driven shaft member. One end of the pin has a cone shape and is adapted to push outwardly three balls which move the clutch member into contact with one of the pulleys. The clutch member is normally spring loaded against the other pulley.

Accordingly, a principal object of the invention is to provide new and improved magnetic clutch means.

Another object of the invention is to provide new and improved high speed magnetic clutch means.

Another object of the invention is to provide new and improved high sensitivity magnetic clutch means.

Another object of the invention is to provide new and improved clutch means having a movement of substantially .005 inch between high speed and low speed positions.

Another object of the invention is to provide new and improved transmission means for a rotary drive.

Another object of the invention is to provide new and improved high and low speed means for rotating a driven shaft, which is extremely fast acting and sensitive.

These and other objects of the invention will be apparent from the following specification and drawings of which:

FIGURE 1 is a side view of a machine incorporating the invention.

FIGURE 2 is a front view of FIGURE 1.

FIGURE 3 is a detail view partly in section of an embodiment of the invention.

FIGURES 1 and 2 show front and side views of testing apparatus which incorporate the present invention. The testing apparatus includes a base B and a pair of frame columns F1 and F2. The test pieces are adapted to be mounted on shafts 30 and 30'. The shaft 30 is adapted to be driven by the motor 55 through high and low speed pulley systems 33 and 35 etc. Magnetic clutch means 45, 46, and 48 are adapted to connect the motor to the driven shaft 30 through either the high or low speed pulley system as will be described. The shaft 30 is rotatably mounted in bracket 2 which is mounted on the frame columns F1 and F2. The testing device may also have counter 10 geared to the shaft 30 for the purpose of counting the test cycles. Shaft 30 has chuck 56.

The lower chuck 57 is mounted on a shaft 30' which is mounted on pivoted lower bracket member 4. Bracket member 4 is constructed so that a horizontal force in one plane may be applied to the lower chuck member 57 by means of the rod or cable 5 which is connected to an electro-magnetic random load generator 6 by means of the pivoted member 7 which is mounted in bracket 1. The bracket 4 may have a constant preload provided by the constant load springs 8 and 8'. The details of the side loading means are outside the scope of the present invention.

More specifically referring to the present invention, the low speed pulley 33 is connected to the motor by means of the belt 33a and the high speed pulley connected to the motor by means of the belt 35a. The magnetic clutch means 45, 46, and 48 will be described in connection with FIGURE 3.

FIGURE 3 shows a detail sectional view of the magnetic clutch means. The driven shaft 30 is mounted in the frame by means of bearings 31 and 32. Low speed pulley 33 is mounted on the shaft 30 by means of the bearing 34. High speed pulley 35 is mounted on a shaft by means of the bearing 36. The clutch member 37 is keyed to the shaft by the means of the keys 37a and 37b, but is movable axially along the shaft, the slots in the shaft being slightly longer in the axial direction than the keys. The clutch member 37 is normally spring loaded into contact with the high speed pulley by means of the spring 40. The low speed pulley and bearing 34 are fixed in axial position on the shaft by the collars 41 and 41' connected to the shaft. The high speed pulley and bearing 36 are fixedly located in axial direction on the shaft by means of the retainer rings 42 and 43.

The shaft 30 has a shaftway 44 at its upper end. Inserted in the shaftway 44 is a pin member 45 which has a cone shape point 45' at its lower end. At the other end of the pin member 45 is rotatably mounted a metal plate 46. The plate 46 is mounted on the pin 45 by means of the bearings 50 and 51. Underneath the plate 46 is mounted an electro-magnetic coil 47 which is fixedly connected to the frame. The metal plate 46 is spaced from the coil 47 and its pole pieces by a gap 48 of about .005 inch.

At the bottom of the shaftway 44 are three apertures 52 etc., spaced 120° apart which extend through the shaft 30. Balls 53 etc. are mounted in these apertures. The clutch member 37 has a tapering portion 37′ adjacent these balls.

The clutch member 37 is normally spring loaded down by spring 40 so that its frictional surface 37c is in contact with the high speed pulley 35, when the electromagnetic coil 47 is unenergized.

In operation when the coil is energized, the plate 46 moves downwardly, in FIGURE 3, causing the pin member 45 to move down so that the cone shape lower portion of pin 45 forces the balls 53 etc., outwardly against the tapering portion 37′ of the clutch member 37 thereby forcing the member 37 up and the frictional surface 37d of the clutch member up against the low speed pulley 33. This axial movement is only of the order of .005 inch. Therefore, speed changes between the pulleys can be accomplished extremely fast and the clutch is extremely sensitive.

I claim:
1. Magnetic clutch means for a rotary shaft drive comprising,
   a frame,
   a driven shaft rotatably mounted in said frame,
   said shaft having an axial shaftway in one end,
   a pin member mounted in said shaft way for axial movement,
   said pin member having a cone point at one end,
   a metal plate rotatably mounted to the other end of said pin,
   electro-magnetic coil means fixedly mounted on said frame adjacent said plate,
   said shaft having three apertures extending transversely through said shaft way, adjacent to said bottom of said shaftway and spaced 120° apart,
   a low speed pulley and a high speed pulley freely mounted on said shaft,
   and means to connect either said low speed pulley or high speed pulley to said shaft comprising,
   three balls set in said apertures,
   a friction clutch member mounted on said shaft and having a tapered portion adjacent said balls,
   said clutch member being keyed to said shaft but movable axially along said shaft so that when said coil is energized said pin member is moved and said cone point moves said walls outwardly forcing said clutch member in one direction into contact with said low speed pulley,
   said clutch member being normally spring loaded in the other direction into contact with said high speed pulley.
2. Magnetic clutch means for a rotary shaft drive comprising,
   a frame,
   a driven shaft rotatably mounted in said frame,
   said shaft having an axial shaftway in one end,
   a pin member mounted in said shaftway for axial movement,
   said pin member having a cone point at one end,
   a metal plate rotatably mounted to the other end of said pin member,
   electro-magnetic coil means fixedly mounted on said frame about .005 inch from said plate,
   said shaft having three apertures transversely through said shaftway, adjacent to said bottom of said shaftway and spaced 120° apart,
   a low speed pulley and a high speed pulley freely mounted on said shaft,
   and means to connect either said low speed pulley or high speed pulley to said shaft comprising,
   three balls set in said apertures,
   a friction clutch member mounted on said shaft and having a tapered portion adjacent said balls,
   said clutch member being keyed to said shaft but movable axially along said shaft so that when said coil is energized said pin member is moved and said cone point moves said balls outwardly forcing said clutch member in one direction into contact with said low speed pulley,
   said clutch member being normally spring loaded in the other direction.
3. Magnetic clutch means for a rotary shaft drive comprising,
   a frame,
   a driven shaft rotatably mounted in said frame,
   said shaft having an axial shaftway in one end,
   a pin member mounted in said shaftway for axial movement,
   said pin member having a cone point at one end,
   a metal plate rotatably mounted to the other end of said pin member,
   electro-magnetic coil means fixedly mounted on said frame adjacent said plate,
   said shaft having three apertures extending transversely through said shaftway, adjacent to said bottom of said shaftway and spaced 120° apart,
   a pulley rotatably mounted on said shaft,
   and means to connect said pulley to said shaft comprising,
   three balls set in said apertures,
   a friction clutch member mounted on said shaft and having a tapered portion adjacent said balls,
   said clutch member being keyed to said shaft but movable axially along said shaft so that when said coil is energized said pin member is moved and said cone point moves said balls outwardly forcing said clutch member in one direction into contact with said pulley,
   said clutch member being normally spring loaded in the other direction.
4. Magnetic clutch means for a rotary shaft drive comprising,
   a frame,
   a driven shaft rotatably mounted in said frame,
   said shaft having an axial shaftway in one end,
   a pin member mounted in said shaftway for axial movement,
   said pin member having a cone point at one end,
   a metal plate rotatably mounted to the other end of said pin member,
   electro-magnetic coil means fixedly mounted on said frame adjacent said plate,
   said shaft having three apertures extending transversely through said shaftway, adjacent to said bottom of said shaftway and spaced 120° apart,
   three balls set in said apertures,
   a clutch member mounted on said shaft and having a tapered portion adjacent said balls,
   said clutch member being keyed to said shaft but movable axially along said shaft so that when said coil is energized said pin member is moved and said cone point moves said balls outwardly forcing said clutch member in one direction.
5. Magnetic clutch means for a rotary shaft drive comprising,
   a frame,
   a driven shaft rotatably mounted in said frame,
   said shaft having an axial shaftway in one end,
   a pin member mounted in said shaftway for axial movement,
   said pin member having a cone point at one end,
   a metal plate rotatably mounted to the other end of said pin member,
   electro-magnetic coil means fixedly mounted on said frame adjacent said plate,
   said shaft having a plurality of equally spaced apertures extending transversely through said shaftway, adjacent to said bottom of said shaftway,
   a plurality of balls one set in each of said apertures, a clutch member mounted on said shaft and having a tapered portion adjacent said balls,
said clutch member being keyed to said shaft but movable axially along said shaft so that when said coil is energized said pin member is moved and said cone point moves said balls outwardly forcing said clutch member in one direction.

References Cited by the Examiner
UNITED STATES PATENTS

| | | | |
|---|---|---|---|
| 1,143,008 | 6/15 | Willey | 192—90 X |
| 2,379,901 | 7/45 | Hare. | |
| 2,611,464 | 9/52 | Rabe | 192—96 X |
| 2,881,597 | 4/59 | Jacobs. | |

DAVID J. WILLIAMOWSKY, *Primary Examiner.*